United States Patent [19]

Allaire et al.

[11] Patent Number: 4,764,195

[45] Date of Patent: Aug. 16, 1988

[54] METHOD OF FORMING REINFORCED GLASS COMPOSITES

[75] Inventors: Roger A. Allaire; William F. Pardue, Jr., both of Big Flats; Edwin J. Simonson, Bath, all of N.Y.

[73] Assignee: Corning Glass Works, Corning, N.Y.

[21] Appl. No.: 52,019

[22] Filed: May 20, 1987

[51] Int. Cl.$^4$ ............................................. C03B 19/09
[52] U.S. Cl. ..................................... 65/18.4; 65/4.21; 65/18.1; 65/45
[58] Field of Search ................... 65/18.1, 18.4, 44, 45, 65/4.21

[56] References Cited

U.S. PATENT DOCUMENTS

| | | | |
|---|---|---|---|
| 3,116,137 | 12/1963 | Vasilos et al. | 65/18.4 |
| 3,378,431 | 4/1968 | Smith et al. | 65/18.1 |
| 4,581,053 | 4/1986 | Prewo et al. | 65/18.4 |

Primary Examiner—Arthur Kellogg
Attorney, Agent, or Firm—Clinton S. Janes, Jr.

[57] ABSTRACT

This invention is directed to a method for thermal pressing a glass-impregnated preform to create a composite body with a glass or glass-ceramic matrix. The method involves contacting the preform during pressing with members prepared from a material exhibiting significant impedance to heat flow in order to delay cooling of the preform during consolidation. The preferred preform consists of a stack of glass-impregnated plies having ceramic fibers and/or whiskers entrained therein.

16 Claims, No Drawings

METHOD OF FORMING REINFORCED GLASS COMPOSITES

BACKGROUND

This invention broadly concerns reinforced glass or glass-ceramic composites. It is specifically directed to a method of forming such composites by thermal pressing a glass-impregnated preform, for example, a stack of glass-impregnated plies, which may be prepared from sheets, films, mats, or the like.

Organic composites, that is, organic polymer matrices reinforced with fibers or whiskers, have been widely adopted because of their enhanced strength. More recently, attention has turned to composites with a glass or glass-ceramic matrix because of their capability for performance under more severe operating conditions than their organic counterparts. In particular, the inorganic matrix materials can withstand considerably higher temperatures. However, they have required development of quite different methods of composite formation.

Heretofore, glass and glass-ceramic composites have customarily been formed by a process known in the art as hot pressing. A body of material to be hot pressed is placed in a mold, heated to an elevated temperature to soften or melt the material, held for a predetermined time at temperature, and under pressure, and then cooled. Characteristically, the material is maintained under molding pressure at least throughout molding and cooling. This may take several hours, and necessarily ties up the pressing equipment for such extended period.

Technically, the hot pressing technique is quite satisfactory. It has been used for development studies and custom production. However, the tieup of equipment over an extended period of time is severely limiting as far as volume production is concerned.

PURPOSES OF THE INVENTION

A basic purpose is to provide an improved method of producing reinforced glass or glass-ceramic composites.

Another purpose is to provide such improved method without sacrifice of essential properties in the composite produced.

A further purpose is to provide a method that requires a shorter time than the known hot pressing method.

A still further purpose is to provide a method which does not require tieup of equipment throughout the process.

Still another purpose is to provide a method wherein the heating and pressing steps can be performed in separate operations.

A practical purpose is to provide a continuous method of pressing reinforced glass or glass-ceramic composites that is adaptable to large volume production.

A further purpose is to provide a method in which the pressing equipment may be maintained at substantially lower temperatures than in hot pressing.

PRIOR ART

The production of inorganic composite bodies exhibiting flexural strengths up to and in excess of 100,000 psi, plus excellent toughness, has been reported. Such bodies have utilized ceramic fibers and/or whiskers, usually carbon (graphite) or SiC, in matrices of glasses or glass-ceramics and have generally been fabricated through hot pressing techniques. Illustrative examples of such bodies and the method of making them are the following U.S. patents: U.S. Pat. No. 4,485,179, U.S. Pat. No. 4,511,663, U.S. Pat. No. 4,588,699, and U.S. Pat. No. 4,589,900. Particular reference is made to U.S. Pat. No. 4,511,663 for a typical hot pressing schedule.

SUMMARY OF THE INVENTION

The present invention is directed to a method for converting, through thermal pressing, a glass-impregnated preform into an integral body having a glass or glass-ceramic matrix. Where a glass-ceramic matrix is desired, a thermally-crystallizable glass constitutes the glass impregnant. As employed herein, a thermally-crystallizable glass is capable of being crystallized in situ (termed "cerammed" in industry) upon being subjected to a predetermined heat treatment. In broadest terms, the inventive method contemplating a glass matrix comprises the five general steps:

(a) forming a glass-impregnated composite preform;

(b) heating the preform to a pressing temperature above the softening point of the glass;

(c) consolidating the preform into an integral body by applying a pressing force to the preform in a mold through members prepared from a material exhibiting significant impedance to heat flow contacting the preform to consolidate the preform;

(d) cooling the mold to a temperature below the softening point of the glass; and thereafter (e) annealing the integral body; the improvement comprising delaying the cooling of the consolidated integral body to a temperature below the softening point of the glass through contact with the members exhibiting significant impedance to heat flow.

Where desired for reinforcement, ceramic fibers and/or whiskers, e.g., $Al_2O_3$, $B_4C$, graphite, mullite, spinel, SiC, $Si_3N_4$, and zircon, may be incorporated into the composite plies. Commonly, the members contacting the top and base of the stack (referred to as "caps" herein) will be individual discs or plates although, as explained below, the caps may comprise an integral part of the pressing apparatus; e.g., the bottom interior of the mold or the base of the pressing plunger. Carbon constitutes the preferred material exhibiting high impedance to heat flow because of its low thermal conductivity and thermal diffusivity, although various ceramic materials such as alumina, mullite, and zircon can be operable.

The inventive method contemplating a glass-ceramic matrix comprises the following six general steps:

(a) forming a glass-impregnated composite preform utilizing a thermally-crystallizable glass;

(b) heating the preform to a pressing temperature above the softening point of the glass;

(c) consolidating the preform into an integral body by applying a pressing force to the preform in a mold through members prepared from a material exhibiting significant impedance to heat flow contacting the preform;

(d) cooling the mold to a temperature below the softening point of the glass;

(e) maintaining or elevating that temperature for a period of time sufficient to crystallize the integral body in situ; and thereafter (f) cooling the integral body to room temperature; the improvement comprising delaying the cooling of the consolidated integral body to a temperature below the softening point of the glass through contact with the members exhibiting significant impedance to heat flow.

In like manner to the integral glass bodies, ceramic fibers and/or whiskers may be incorporated into the precursor composite preform for reinforcement.

In the main, fiber reinforced glass and glass-ceramic composite articles have been prepared according to the following hot pressing practice:

(1) a plurality of fibers, for example in the form of a tow, a ribbon, or a fabric, are impregnated with a slurry of glass powder as disclosed, for example, in U.S. Pat. No. 4,314,852;

(2) the impregnated fiber body is cut into sheets or plies of appropriate size and shape;

(3) a sufficient number of those plies are stacked to provide a body of a desired thickness after pressing;

(4) the stack of plies is placed in a mold of a desired shape;

(5) the mold with the stacked plies therein is heated, in pressing position, to a predetermined consolidating temperature;

(6) pressure is applied to the stack to consolidate it; and then (7) the heat is removed and the consolidated body allowed to cool under pressure in the mold, that cooling process taking several hours due to retention of heat by the materials of the mold.

Because pressure is maintained at least throughout the pressing and cooling steps, the equipment therefor is tied up for an extended period.

Where a stack of glass-impregnated composite plies comprises the preform, the inventive method comprises:

(a) stacking a plurality of glass-impregnated composite plies;

(b) heating that stack to a temperature above the softening point of the glass;

(c) consolidating the stack into an integral body by applying a pressing force to the stack in a mold through members prepared from a material exhibiting significant impedance to heat flow contacting at least the top and base of the stack;

(d) cooling the mold from the pressing temperature to a temperature below the softening point of the glass; and thereafter (e) annealing the integral body.

Where a glass-ceramic matrix is desired, a thermally-crystallizable glass will be used as the impregnant of the plies and, after cooling the glass from the pressing temperature to a temperature below the softening point of the glass, that latter temperature will be maintained or elevated for a sufficient length of time to ceram the glass.

Again, in both instances, the cooling of the integral body from the pressing temperature to below the softening point of the glass is delayed through contact with the members exhibiting significant impedance to glass flow.

GENERAL DESCRIPTION

As used herein: "thermal pressing" means applying a compressing load to a body, as by a plunger, while the body is at an elevated temperature where consolidation of the glass can take place.

"Plies" means any form of blank cut or otherwise prepared from a glass-impregnated sheet, fabric, mat, or the like.

Any glass or glass-ceramic reinforced composite may be pressed in accordance with the present inventive method. The method is not limited to, or characterized by, any particular glass.

The published art currently expresses a preference for borosilicate, aluminosilicate, and high-silica glasses, and glass-ceramics where the predominant crystal phase contained therein is selected from the group consisting of $\beta$-spodumene solid solution, $\beta$-quartz solid solution, Ba-osumilite solid solution, and canasite solid solution.

It is customary to employ graphite fibers with borosilicate glasses and silicon carbide fibers with aluminosilicates. Nevertheless, use of other ceramic fibers is not excluded, and the use of ceramic whiskers as a reinforcing medium has also been shown to be effective. The primary development work has been with fibers, however, and the invention is so described hereafter.

It is characteristic of our new process that it resembles known glass pressing processes more closely than hot pressing. However, in forming fiber and/or whisker reinforced composite bodies, our process is one of consolidating a glass-impregnated mass of fibers and/or whiskers, rather than filling a mold with and shaping a fully consolidated fluid glass.

In traditional glass pressing practice, the molten glass readily flows to fill a mold of desired shape as a plunger is momentarily applied. In the present composites, however, interstices typically exist between the reinforcing elements which are very small, e.g., normally a hundred microns or less. Fluid glass resists entry into such minute interstices, thus raising a doubt that normal glass flow occurs.

The consolidation process is, therefore, considered to be a pressure-assisted sintering process, since pressures several magnitudes greater would normally be required for glass flow. Thus, a composite of glass and graphite fiber can be consolidated to near full density with pressures no greater than 4000 psi, and frequently no greater than 1250 psi. This occurs with a glass viscosity of not less than $10^2$ poises and not more than about $10^4$ poises, usually about $10^3$ poises.

The efficacy of the new pressing procedure over hot pressing is such that parts may be moved continuously through a three-chamber system at rates at least 12 times more rapid than those previously required for hot pressing. This capability renders the procedure adaptable to commercial production practice.

The present thermal pressing method differs from the prior hot press technique in several significant respects. A major factor is that pressure is applied only during the consolidation step. Cooling starts with pressing which may be unrestrained, or may be in a readily-cooled mold. Consequently, cooling is much more rapid, and the press can be reused immediately.

Characteristically then, the preheat step, the consolidation and cooling step, and the annealing step may be conducted entirely separately, and in different locations, if desired. This flexibility permits setting up a continuous processing line.

When the sample is preheated separately, it is moved hot into the pressing station and pressure applied, as by a plunger. During pressure application, which is a matter of minutes, the part is consolidated and cooled to near the temperature at which a further processing step, such as a glass annealing or ceramming step is conducted on the consolidated body. The consolidated body may then be moved out of the pressing station and into an annealing kiln or chamber where it is then cooled to ambient.

A key factor in the success of the method is the placing of the preform between members composed of a material having a significant impedance to heat flow. Suitable materials include solid carbon, ceramics, and other materials that are capable of significantly impeding heat transfer from the preform to the pressing plunger and anvil. Hence, materials demonstrating high thermal conductivity, e.g., metals, would be less suitable for this application.

The delay in thermal transfer has at least two salutary effects. First, cooling the preform is sufficiently delayed to enable completion of the consolidation. In spite of the delay, however, the composite is cooled through the impedance members in a matter of minutes, rather than hours. Second, the delay avoids the need for the entire pressing chamber and equipment to be at consolidation temperature, as in hot pressing. Rather, the chamber and the press will normally be near a further processing temperature and the composite will cool to that temperature. Pressure may be released as soon as the composite reaches a point where it can no longer expand and lose density.

The further processing may be any further operation at an intermediate temperature. For example, the composite may be annealed where a glassy matrix is maintained. If the glass is to be cerammed, that is, converted to a glass-ceramic, then the composite may be cooled to below the softening point of the glass and thereafter held at that temperature or reheated to a higher temperature to crystallize the glass in situ.

The degree of delay provided by the impedance members is, of course, dependent on the actual thermal conductivity, thermal diffusivity, and specific heat of the material comprising the member, as well as the thickness of the member. Thus, impedance members may be tailored to the requirements of a particular application. For many purposes blocks or plates of monolithic graphite no more than a half inch thick will perform very satisfactorily.

It will also be appreciated that the impedance member need not be restricted to a flat plate or disc. For example, the surface facing the preform, if not the whole member, may be given the reverse of any shape desired in the face of the composite. To illustrate, if a dished face on the composite is desired, a correspondingly outwardly curved surface may be machined on the impedance member. This practice has been termed "matched mold forming" in the art.

Factors influencing, and the degree of their influence on, the present thermal treatment process were determined from the results of numerous one-dimensional, transient, ANSYS runs made of a thermal model. These runs clearly demonstrated the following distinct influencing trends:

1. The composite surface temperature is only weakly dependent on the composite thickness.
2. The composite surface temperature is strongly dependent on the thickness of the temperature impedance material. An increase of about 100° C. occurs with each 0.1 inch thickness increase in a graphite cap, for example, using typical property values for graphite.
3. The composite surface temperature is more sensitive to changes in the thermal conductivity of the impedance member than changes in the specific heat thereof.
4. The composite surface temperature can be shown to be dependent upon the properties and geometry of the thermal impedance material. These parameters may be arranged as a ratio of the thickness of the thermal impedance material squared to its thermal diffusivity. In this form the ratio has units of time.

As the process depends on having a high composite surface temperature during pressing, impedance materials demonstrating a higher ratio of thickness to thermal diffusivity will normally be preferred.

The ratio relationship may be expressed as:

$$T = f M^2 / D$$

where
T = surface temperature of composite
M = thickness of the cap
D = thermal diffusivity of the cap

DESCRIPTION OF THE PREFERRED EMBODIMENTS

EXAMPLE 1

A tow of graphite fibers was impregnated by being passed through a slurry of a commercial borosilicate glass. Blanks of predetermined form were cut from the impregnated fibers and stacked to provide an ultimate thickness of 0.125" in the pressed composite. The stack of blanks was assembled with top and base caps of graphite having the same areal dimensions as the stack and each having a thickness of 0.25".

That assembly was then subjected to the following procedure:

(1) the assembly was heated to 1235° C. in 15 minutes;

(2) the assembly was moved to a temperature zone of about 450° C. where pressing force of 1200 psi was applied for 60 seconds by a plunger operating at a temperature of about 500° C. to consolidate and cool the stacked blanks into an integral body;

(3) the plunger was removed and integral body continued to cool;

(4) the integral body was annealed at 450° C. for 15 minutes; and thereafter (5) the mold with the integral body therein was withdrawn from the heating chamber and the body cooled to room temperature in the ambient atmosphere.

It might be noted that a relatively long press time (compared to glass pressing) was required to achieve full composite density. This is discussed further relative to Example 2, infra. In ordinary glass pressing involving fluid glass, a plunger dwell time of only a fraction of a second may "fill" a mold and provide a rigid glass skin.

EXAMPLE 2

A mixture was prepared consisting of 45% by volume deagglomerated silicon carbide whiskers, and 55% by volume finely-divided alkaline earth aluminosilicate glass powder and that mixture shaped into a preform of such dimensions to yield a pressed composite body having a thickness of about 0.125". That preform was placed into a cylindrical graphite mold and pressure was applied through a plunger having a carbon surface unit built into the structure thereof. The preform was then subjected to the following treatment:

(1) the mold and preform were heated to 1200° C. in 15 minutes;

(2) the mold and preform were moved to a temperature zone of about 450° C. and a pressing force of 1500 psi was applied for 90 seconds by a plunger operating at about 500° C. to consolidate and cool the preform;

(3) the plunger was removed and the consolidated preform continued to cool;

(4) the consolidated preform was annealed at 450° C. for 15 minutes; and thereafter (5) the mold with the consolidated preform therein was withdrawn from the heating chamber and the consolidated preform cooled to room temperature in the ambient environment.

The resulting glass matrix composite appeared to be fully consolidated.

As can be observed from Examples 1 and 2, a pressing dwell time in excess of 30 seconds is typical for producing a fully dense composite having a thickness of about 0.125". That period is far longer than the essentially fractions of seconds involved in the conventional pressing of fluid glass. Such longer period is required to complete the consolidating/densifying of the inventive products. As was explained earlier, in traditional glass pressing processes the molten glass flows readily to fill a mold of desired shape as pressure is momentarily applied. The present products are formed from glass particles and, optionally, fibers and/or whiskers. A momentary contact pressing would result in a cold surface skin on the pressed body, thereby precluding complete densification thereof. Hence, the present consolidation process is considered to be a pressure-assisted sintering process which requires time to insure that the glass flows sufficiently to fill any microvoids.

We claim:

1. A method for converting, through presure-assisted thermal sintering, a glass-impregnated composite preform having ceramic fibers and/or whiskers incorporated therein into a reinforced integral body having a glass matrix comprising the steps of:
   (a) forming a glass-impregnated preform having ceramic fibers and/or whiskers incorporated therein;
   (b) heating said preform to a temperature above the softening point of the glass;
   (c) applying a pressing force to said preform in a mold to consolidate said preform into an integral body;
   (d) cooling said mold to a temperature below the softening point of said glass; and thereafter
   (e) annealing said integral body; the improvement comprising consolidating said preform by exposing said preform, when the viscosity of the glass is not less than about $10^2$ poises and not more than about $10^4$ poises, to a temperature of about the annealing point of the glass and applying pressure thereto for no more than a few minutes, and thereafter delaying the cooling of said consolidated integral body to a temperature below the softening point of the glass by contacting said preform during said pressing with members prepared from a material exhibiting significant impedance to heat flow, said members exhibiting low thermal conductivity and thermal diffusivity.

2. A method according to claim 1 wherein said material exhibiting significant impedance to heat flow is selected from the group consisting of carbon, alumina, mullite, and zircon.

3. A method according to claim 1 wherein said preform consists of a stack of glass-impregnated composite plies.

4. A method according to claim 3 wherein said members prepared from a material exhibiting significant impedance to heat flow contact at least the top and base of said stack.

5. A method according to claim 4 wherein said members contacting the top and base of said stack correspond in areal dimensions to said stack.

6. A method according to claim 4 wherein at least one of said members contacting the top and base of said stack has a surface configuration corresponding to a pattern to be molded into said integral body.

7. A method according to claim 4 wherein said member contacting the base of said stack comprises the bottom interior of said mold.

8. A method according to claim 1 wherein said pressing force does not exceed about 4000 psi.

9. A method for converting, through pressure-assisted thermal sintering, a thermally-crystallizable, glass-impregnated composite preform having ceramic fibers and/or whiskers incorporated therein into a reinforced integral body having a glass-ceramic matrix comprising the steps of:
   (a) forming a glass-impregnated composite preform having ceramic fibers and/or whiskers incorporated therein;
   (b) heating said preform to a temperature above the softening point of the glass;
   (c) applying a pressing force to said preform in a mold to consolidate said preform into an integral body;
   (d) cooling said mold to a temperature below the softening point of said thermally-crystallizable glass;
   (e) maintaining or raising that temperature for a period of time sufficient to crystallize said integral body in situ; and thereafter
   (f) cooling said integral body to room temperature; the improvement comprising consolidating said preform by exposing said preform, when the viscosity of the thermally-crystallizable glass is not less than about $10^2$ poises and not more than about $10^4$ poises, to a temperature of about the annealing point of the glass and applying pressure thereto for no more than a few minutes, and thereafter delaying the cooling of said consolidated integral body to a temperature below the softening point of said thermally-crystallizable glass by contacting said preform with members prepared from a material exhibiting significant impedance to heat flow, said members exhibiting low thermal conductivity and thermal diffusivity.

10. A method according to claim 9 wherein said material exhibiting significant impedance to heat flow is selected from the group consisting of carbon, alumina, mullite, and zircon.

11. A method according to claim 9 wherein said preform consists of a stack of thermally-crystallizable, glass-impregnated glass plies.

12. A method according to claim 11 wherein said members prepared from a material exhibiting significant impedance to heat flow contact at least the top and base of said stack.

13. A method according to claim 12 wherein said members contacting the top and base of said stack correspond in areal dimensions to said stack.

14. A method according to claim 12 wherein at least one of said members contacting the top and base of said stack has a surface configuration corresponding to a pattern to be molded into said integral body.

15. A method according to claim 12 wherein said member contacting the base of said stack comprises the bottom interior of said mold.

16. A method according to claim 9 wherein said pressing force does not exceed about 4000 psi.

* * * * *